United States Patent [19]

Kaleta

[11] Patent Number: 5,322,032
[45] Date of Patent: Jun. 21, 1994

[54] FENCE IDENTIFICATION DEVICE

[76] Inventor: Donald J. Kaleta, 4979 Ireland Rd., Rome, Ohio 44085

[21] Appl. No.: 926,044

[22] Filed: Aug. 5, 1992

[51] Int. Cl.$^5$ .......................................... G01D 13/00
[52] U.S. Cl. ........................................ 116/209; 256/4; 248/302
[58] Field of Search ............... 116/22 A, 173, 200, 116/209, DIG. 33; 256/4, 10, 32, 47, 57, DIG. 3; 248/231.8, 302, 303, 309.2; 24/27, 551, 552, 553, 716; 40/302

[56] References Cited

U.S. PATENT DOCUMENTS

| | | | |
|---|---|---|---|
| 249,777 | 11/1881 | La Fleur | 116/209 X |
| D. 310,955 | 10/1990 | Platten | D8/382 |
| 517,548 | 4/1894 | Herweyer | 256/4 |
| 700,208 | 5/1902 | Lafo et al. | 24/551 |
| 742,417 | 10/1903 | Hammarstrom . | |
| 754,285 | 3/1904 | Dick . | |
| 985,288 | 2/1911 | Schade . | |
| 1,322,655 | 11/1919 | Townley | 24/552 |
| 1,703,901 | 9/1927 | Schultz . | |
| 1,964,395 | 6/1934 | Weiss | 24/551 X |
| 2,007,612 | 7/1935 | Perkins | 24/551 X |
| 2,125,768 | 8/1938 | Christensen et al. | 24/552 X |
| 2,607,096 | 3/1950 | Sousa . | |
| 2,722,195 | 11/1955 | Rockafeller | 116/22 A |
| 3,104,644 | 9/1963 | Burton | 116/209 |
| 3,398,475 | 8/1968 | Palmer . | |
| 3,785,337 | 1/1974 | Flowerday | 116/209 |
| 4,109,605 | 8/1978 | Bächli | 116/22 A |
| 4,597,357 | 7/1986 | LeMessurier | 116/22 A |
| 4,729,338 | 3/1988 | Relzmann | 116/173 X |
| 4,792,254 | 12/1988 | Platten | 403/48 |
| 4,847,957 | 7/1989 | Ranta | 24/237 |
| 4,893,788 | 1/1990 | Chave | 256/47 |
| 4,982,932 | 1/1991 | Baker | 256/47 |

FOREIGN PATENT DOCUMENTS

| | | | |
|---|---|---|---|
| 0135252 | 4/1952 | Denmark | 248/302 |
| 8101786 | 7/1981 | PCT Int'l Appl. | 116/22 A |

Primary Examiner—William A. Cuchlinski, Jr.
Assistant Examiner—John L. Beres
Attorney, Agent, or Firm—Watts, Hoffmann, Fisher & Heinke Co.

[57] ABSTRACT

In an effort to minimize injuries to farm animals, and the explicit and implicit costs associated with those injuries, a novel fence identification device which can be easily secured to a fence wire to securely position a flag on the wire is provided. The device comprises a spring wire clamp having a loop at one end and a hook at the other end. The loop end defines a substantially U-shaped brace portion of predetermined length and width. The hook end defines a predetermined acute angle which is sized to pass within the brace portion in tensioned relationship. The flag includes an oversized eyelet aperture and is suspended from the spring wire by the eyelet. The hook end is then passed within the loop end to compress the spring wire and define a gap in which a fence wire is placed. Once released, the tension of the spring wire secures the fence wire between the vortex of the hook end and the U-shaped brace portion.

12 Claims, 1 Drawing Sheet

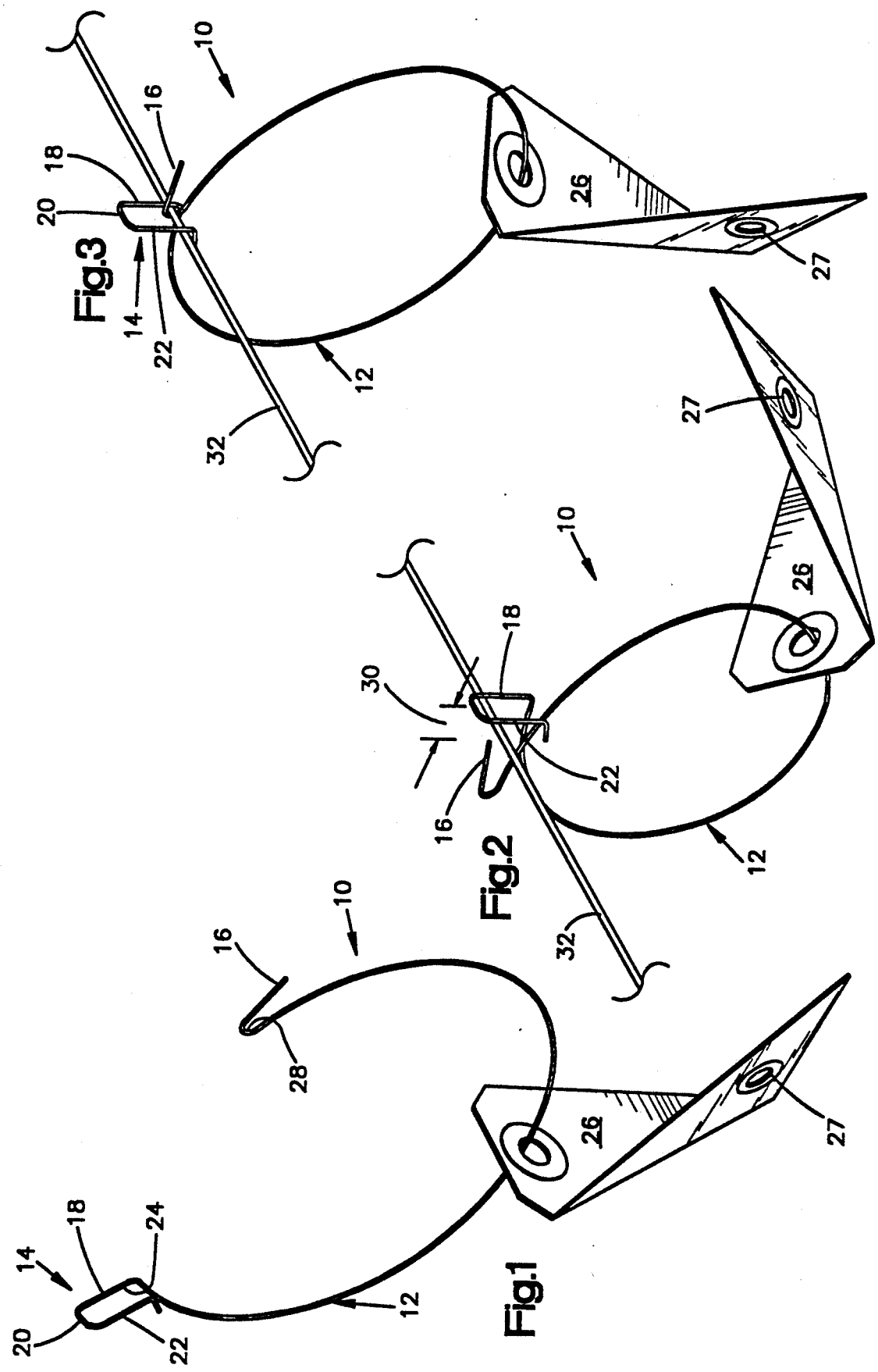

FENCE IDENTIFICATION DEVICE

FIELD OF THE INVENTION

This invention relates to a fence identification device having a fence flag and fence clamp for securing the flag to a fence wire in a stable, slip resistant manner.

BACKGROUND ART

Many farmers fence their pastures with either barbed wire or a smooth, non-barbed electric wire. Generally, many farming operations use single, double or triple strands of wire to delineate the perimeter of their pastures. The wire is usually tacked to a fence post. Fence wire which is to receive an electric current, i.e., "hot wire," is usually secured to an insulator which is tacked to a wooden fence post. Alternatively, specialty electric fence posts having insulative portions are also used.

In many instances, cattle and other animals injure themselves by inadvertently becoming entangled in the fence wire due to their inability to visually identify the presence of the wire against the natural background of the outdoors. In extreme instances, calves and cattle, once entangled, strangle and suffocate in an effort to free themselves.

The effort required to treat and nurse animal injuries is time consuming and expensive. In many instances the cattle must be separated from the herd until medical assistance can be provided. Moreover, the time consumed in nursing and ministering to injured animals detracts from the farmers or ranchers ability to complete other tasks. This is especially critical when one considers that certain tasks must be performed at defined times. Moreover, the energy required to heal a wound detracts from an animal's ability to develop properly, produce milk or to add weight.

In an effort to alert cattle and other animals to the presence of fence wires, farmers and ranchers have tied ribbons or flags to the fence wires at predetermined intervals to promote easy fence identification. The flags are usually ribbon shaped so that they flutter significantly under slight breezes or contact with other stimuli when they are secured to the wires.

Clamps have long been used to secure the items, i.e. ribbons, clothes, etc., to wires stretched between two points. One such clamp is the common clothes pin and other like devices which define a converging gap. In use, a portion of a ribbon is folded over the wire. The converging gap of the pin is placed over the wire and the ribbon to be supported by the wire. The pin is then pressed onto the wire until a friction fit between the pin, wire and the material is realized. Over time, environmental factors, i.e. wind, rain, loosens the fit of the pin thereby allowing the pin and the ribbon to move along and/or fall off the wire. Spring biased pins have also been utilized. However, such pins lack sufficient force to securely position a pin on a wire for extended periods of time. Moreover, the expense of deploying a variable number of pins around the perimeter of a pasture is excessive due to the manufacturing and assembly costs associated with multiple part spring biased pins.

Tying rags or ribbons to fence wire is also known. However, tying material to the wires limits the size, shape and nature of the flags which can be used. Tying generally requires flags which are narrow and flexible, thereby increasing the number of flags required to adequately identify a fence wire. Additionally, narrow, ribbon-like flags tend to wrap around the fence wire shortly after deployment, thereby minimizing their effectiveness.

Unfortunately, tying or clipping the flags to fence wires using conventional apparatus either limits flag fluctuation and/or does not securely position the flag on the wire. Under normal conditions, the force of wind, snow and driving rain upon a flag slides the flags and clamps along the wires until the fence post acts as a stop. In many instances, the flags remain correctly positioned only for a few days or weeks. Thereafter, the flags must be repositioned on the wire, another time consuming activity which detracts from the farmers' or ranchers' ability to attend to more critical tasks.

SUMMARY OF THE INVENTION

The present invention provides a novel fence identification device which can be easily secured to a fence wire to securely position a flag on the wire. In a preferred embodiment, weather resistant flags of various sizes and shapes are utilized with a spring wire clamp to provide a contrasting visual stimulus once securely positioned on a fence wire. The weight and gripping force of the clamp on the fence wire is sufficient to securely position the flag on the wire even under adverse weather conditions.

In a preferred embodiment, the clamp comprises a spring wire having a loop at one end and a hook at the other end. The loop end defines a substantially U-shaped brace portion of predetermined length and width. The hook end defines a predetermined acute angle which is sized to pass within said brace portion in tensioned relationship. A flag manufactured from weather resistant materials, i.e. plastics or canvas, is variably sized and shaped to provide contrasting stimuli for easy fence identification.

In one embodiment, the flag includes an oversized eyelet aperture, and is suspended from the spring wire by passing either end of the spring wire through the eyelet. The hook end of the spring wire is then passed within the loop end to compress the spring wire and define a gap in which a fence wire is placed. Once released, the tension of the spring wire secures the fence wire between the vortex of the hook end and the U-shaped brace portion. The force of the spring wire presses the vortex of the hook end and the U-shaped brace portion against the wire with sufficient force to securely position the clamp and flag on a fence wire under adverse weather circumstances.

In the illustrated embodiment, the fence identification device is comprised of a clamp which is formed from a spring wire which has a length approximately eight inches and a diameter of at least 0.040 inches. The spring wire defines a loop end and a hook end. The loop end defines a substantially "U" shaped brace portion which is approximately 3/16 of an inch wide and ½ inch in length. The base portion also defines an opening. The opposite end of the spring wire includes the hook end which defines an acute angle.

The spring wire is compressed by passing the hook end within the opening of the "U" shaped brace portion to define a gap. The flag is suspended from the spring wire. Preferably the flag is creased to define a ninety degree bend which prevents the flag and clamp from spinning around the fence wire under adverse weather conditions. Thereafter the identification device is secured to the fence as discussed above.

BRIEF DESCRIPTION OF THE DRAWINGS

FIG. 1 is a elevational perspective view of the wire clamp and flag of the present invention in a relaxed state;

FIG. 2 is a perspective view of the clamp and flag of FIG. 1 illustrating a method of securing the fence clamp to a fence wire; and FIG. 3 is a perspective view of the fence clamp and flag of FIG. 1 when secured to a fence wire.

BEST MODE FOR PRACTICING THE INVENTION

Referring now to FIG. 1, a fence identification device includes a fence clamp 10, formed from a spring wire 12 having a length of approximately 8 inches and a diameter of at least 0.040 inches. The spring wire 10 defines a loop end 14 and a hook end 16.

The loop end 14 defines a substantially U-shaped brace portion 18. The U-shaped brace portion 18 generally has a base portion 20 and a pair of leg portions 22. The base portion 20 is approximately 3/16 inch wide and the leg portions 22 are approximately ⅛ inch in length. The leg portions 22 and the base portion 20 define an opening 24. The hook end 16 defines an acute angle 28.

The spring wire is compressed by passing the hook end 16 within the opening 24 of the substantially U-shaped brace portion 18 to define gap 30 as shown in FIG. 2. A weather-resistant, variably shaped and colored, creased flag 26 having a pair of oversized apertures 27 is suspended from the spring wire 10 between the loop end 14 and the hook end 16. The flag 26 crease defines a 90° bend to prevent the flag and clamp from spinning or "propellering" around the fence wire 32. In the event one of the apertures 27 tear during use, the remaining aperture may be utilized to minimize flag 26 costs.

The clamp 10 and flag 26 are secured to a fence wire 32 by passing the hook end 16 within the opening 24 of the brace portion 18 to define the gap 30. The fence wire 32 is positioned in the gap 30 between the leg portions 22 of the brace portion 18 and the vortex of the hook end 16. As the spring wire is relaxed, the gap 30 decreases so that the fence wire 32 is securely gripped between the vortex of the hook end 16 and the leg portions 22 of the loop end 14. The ratio of the coefficient of friction created by the clamp 10 on the fence wire 32 is sufficient to overcome the forces applied to the clamp 10 and flag 26 under normal and adverse weather conditions, to securely position the identification device on a fence wire. The diameter and length of the spring wire 10 can be varied to facilitate the deployment of heavier, larger flags securely on a fence wire. varied to facilitate the deployment of heavier, larger flags securely on a fence wire.

While a preferred embodiment of the invention has been described with particularity, modification or alterations may be made therein without departing from the spirit and scope of the invention set for in the appended claims.

I claim:

1. An apparatus for use with a barrier having at least one member defining a boundary, said apparatus for enhancing the visibility of the member and comprising:

a clamp having a spring portion formed in a single continuous and uninterrupted arcuate configuration and having a loop end and a hook end, said hook end and said loop end located in a normally spaced apart relationship;

a flag having at least one aperture for receipt on said spring portion of said clamp for suspending said flag from said clamp, said flag being easily movable along said spring portion between said loop end and said hook end;

said loop end for engaging the member;

said hook end for engaging the member opposite said loop end; and said loop end and said hook end being relatively movable past one another from the normally spaced apart relationship in a direction substantially parallel to a plane containing said spring portion to an overlapping relationship to define a gap between said hook end and said loop end for receiving the member therebetween and for tensioning said spring portion to urge said ends towards the spaced apart relationship and to frictionally engage the member between said loop end and said hook end to resist movement of said apparatus along said member.

2. The apparatus set forth in claim 1 wherein said loop end includes a U-shaped brace portion including a base connecting a pair of legs spaced apart in a direction transverse to the plane containing said spring portion adapted to engage the member at two locations along the member.

3. The apparatus set forth in claim 2 wherein said hook end includes a portion extending at an acute angle relative to said spring portion defining a vortex for engaging the member at more than one location around the member, said hook end movable between and beyond said spaced apart legs from the first position to define the gap for receiving the member.

4. The apparatus set forth in claim 1 further including at least one additional aperture in said flag enabling reuse of said flag in the event that material surrounding the first aperture is damaged to an extent rendering the first aperture unusable.

5. The apparatus set forth in claim 1 further including means associated with said flag defining a crease in said flag for a first portion of said flag to extend at a substantially right angle to a second portion of said flag to reduce the surface area of said flag exposed in one direction to environmental conditions.

6. An apparatus for use with a fence having at least one wire member defining a boundary, said apparatus for enhancing the visibility of the wire member and comprising:

a spring member formed into a single continuous and uninterrupted arcuate configuration and having a loop end and a hook end which are normally spaced apart;

a flag having at least one aperture for receipt on said spring member when said ends are spaced apart to suspend said flag from said spring member, said flag being easily movable along said spring portion between said loop end and said hook end;

said loop end for engaging the wire member; and said hook end movable from the spaced apart position past said loop end to a position defining a gap therebetween to stress the spring member and for engaging the wire fence member at a location diametrically opposite said loop end to clamp the wire member between said loop end and said hook end by the spring member urging the ends towards the spaced apart position to resist movement of said apparatus along said wire member.

7. The apparatus set forth in claim 6 wherein said loop end includes a U-shaped brace portion including a base connecting a pair of spaced apart legs adapted to engage the wire member at two locations along the wire member.

8. The apparatus set forth in claim 7 wherein said hook end includes a portion extending at an acute angle relative to said spring member defining a vortex for engaging the wire member at more than one location around the member, said hook end extendible between said spaced apart legs to define the gap for receiving the member.

9. The apparatus set forth in claim 6 further including at least one additional aperture in said flag enabling reuse of said flag in the event that material surrounding the first aperture is damaged to an extent rendering the first aperture unusable.

10. The apparatus set forth in claim 6 further including means associated with said flag defining a crease in said flag for a first portion of said flag to extend at a substantially right angle to a second portion of said flag to reduce the surface area of said flag exposed in one direction to environmental conditions.

11. A fence identification device comprising:
a) a clamp having a spring portion having a single continuous and uninterrupted arcuate shape when said spring portion is untensioned;
b) a U-shaped loop end on said clamp defining a passage;
c) a hook end on said clamp spaced apart from said loop end when said spring portion is untensioned, said hook end being movable from the spaced apart position beyond the passage defined by said loop end to tension said spring portion and define a gap between said hook end and said loop end;
d) a fence wire receivable in the gap defined between said loop end and said hook end is clamped in a substantially non-sliding relationship in response to tension in the spring portion urging said ends towards the spaced apart position; and
e) a flag including surface means defining an aperture for receiving the spring wire portion to suspend said flag from said spring portion, said flag being easily movable along said spring portion between said loop end and said hook end.

12. A method of securing a flag to a boundary defining member, said method comprising the steps of:
providing a clamp having a spring portion shaped in a single continuous and uninterrupted arcuate configuration with a loop end and a hook end in a normally spaced apart first relative position;
providing a flag;
suspending the flag from the spring portion of the clamp so the flag is easily movable along the spring portion between the loop end and the hook end;
tensioning the spring portion by moving the hook end past the loop end from the first relative position to define a gap;
placing a boundary defining member within the gap between the loop end and the hook end; and
releasing the tension in the spring portion to clamp the boundary defining member securely between the hook end and the loop end to resist movement along the boundary defining member.

* * * * *